(12) United States Patent
Grefenstein et al.

(10) Patent No.: US 12,485,655 B2
(45) Date of Patent: Dec. 2, 2025

(54) RECYCLABLE, EASILY TEARABLE PACKAGING LAMINATE HAVING A GOOD BARRIER EFFECT AND METHOD FOR PRODUCTION THEREOF

(71) Applicant: Constantia Pirk GmbH & Co. KG, Pirk (DE)

(72) Inventors: Achim Grefenstein, Altrip (DE); Markus Kick, Weiden (DE); Thami Lamtigui, Munich (DE)

(73) Assignee: CONSTANTIA PIRK GMBH & CO. KG, Pirk (DE)

( * ) Notice: Subject to any disclaimer, the term of this patent is extended or adjusted under 35 U.S.C. 154(b) by 175 days.

(21) Appl. No.: 16/611,124

(22) PCT Filed: Apr. 24, 2018

(86) PCT No.: PCT/EP2018/060462
§ 371 (c)(1),
(2) Date: Nov. 5, 2019

(87) PCT Pub. No.: WO2018/202479
PCT Pub. Date: Nov. 8, 2018

(65) Prior Publication Data
US 2020/0122439 A1    Apr. 23, 2020

(30) Foreign Application Priority Data

May 5, 2017  (AT) .............................. A 50372/2017
Jul. 25, 2017  (AT) .............................. A 50622/2017

(51) Int. Cl.
*B32B 1/02*  (2006.01)
*B32B 27/08*  (2006.01)
(Continued)

(52) U.S. Cl.
CPC .............. *B32B 27/08* (2013.01); *B32B 27/32* (2013.01); *B32B 7/12* (2013.01); *B32B 27/306* (2013.01);
(Continued)

(58) Field of Classification Search
CPC  B32B 1/02; B32B 27/32; B32B 27/34; Y10T 428/1352; Y10T 428/1383; Y10T 428/31855; B65D 88/00
(Continued)

(56) References Cited

U.S. PATENT DOCUMENTS 4,708,705 A  *  11/1987  Aubry ................. B31B 70/8123
                                                 493/213
2011/0178222 A1* 7/2011  Kani ....................... C08J 3/226
                                                 524/503
(Continued)

FOREIGN PATENT DOCUMENTS

EP          229715 A2  *  7/1987
EP         0911150 A2     4/1999
(Continued)

OTHER PUBLICATIONS

Indorama Eleme Petrochemicals Limited Technical Data SHeet, Dec. 2016.*
(Continued)

*Primary Examiner* — Marc A Patterson
(74) *Attorney, Agent, or Firm* — Husch Blackwell LLP

(57) ABSTRACT

A recyclable, easily tearable packaging laminate having a good barrier effect, including a first laminate layer and a second laminate layer. The the first laminate layer is a co-extruded, in the machine direction stretched composite consisting of a substrate layer having a high HDPE content of at least 60% by volume, a bonding layer and a barrier layer consisting of a barrier polymer, preferably polyamide
(Continued)

or ethylene vinyl alcohol copolymer, having a maximum thickness of 20% of the overall thickness of the first laminate layer. The bonding layer is arranged between the substrate layer and the barrier layer and the first laminate layer is connected on the barrier layer thereof to the second laminate layer.

16 Claims, 2 Drawing Sheets

(51) Int. Cl.
    *B32B 27/32*     (2006.01)
    *B32B 1/08*     (2006.01)
    *B32B 7/12*     (2006.01)
    *B32B 27/30*     (2006.01)
    *B32B 27/34*     (2006.01)

(52) U.S. Cl.
    CPC ......... *B32B 27/34* (2013.01); *B32B 2307/514* (2013.01); *B32B 2439/46* (2013.01); *B32B 2439/70* (2013.01)

(58) Field of Classification Search
    USPC ......... 428/34.1, 35.7, 35.9, 36.7, 474.4, 500
    See application file for complete search history.

(56) References Cited

U.S. PATENT DOCUMENTS

| | | | |
|---|---|---|---|
| 2013/0266751 A1 | 10/2013 | Schneider et al. | |
| 2014/0151259 A1* | 6/2014 | Wochner | B29C 66/929 206/524.1 |
| 2016/0229157 A1 | 8/2016 | Clare | |
| 2016/0339663 A1 | 11/2016 | Clare | |
| 2017/0001420 A1 | 1/2017 | Sebald et al. | |
| 2017/0107341 A1* | 4/2017 | Jayaraman | B29C 48/08 |
| 2018/0079188 A1 | 3/2018 | Grefenstein et al. | |

FOREIGN PATENT DOCUMENTS

| | | |
|---|---|---|
| EP | 0673759 B1 | 6/2001 |
| EP | 0918635 B1 | 12/2002 |
| EP | 1769908 A1 | 4/2007 |
| EP | 2796289 A1 * | 10/2014 |
| JP | 6-262737 A * | 9/1994 |
| JP | H06262737 A | 9/1994 |
| JP | 2006150624 A | 6/2006 |
| WO | 9111317 A1 | 9/1991 |
| WO | 2005113370 A1 | 12/2005 |
| WO | 2007104513 A1 | 9/2007 |
| WO | 2008091321 A1 | 7/2008 |
| WO | 2009017588 A1 | 2/2009 |
| WO | 2009154939 A1 | 12/2009 |
| WO | 2012049195 A1 | 4/2012 |
| WO | 2013032932 A1 | 3/2013 |
| WO | 2015175871 A1 | 11/2015 |
| WO | 2016156293 A1 | 10/2016 |

OTHER PUBLICATIONS

International Preliminary Report on Patentability Application No. PCT/EP2018/060462 Completed: May 9, 2019 6 Pages.
Tirtha Chatterjee et al: "Machine direction orientation of high density polyethylene (HDPE): Barrier and optical properties", Polymer., vol. 55, No. 16, published Aug. 1, 2014, pp. 4102-4115, XP055571515, GB, ISSN: 0032-3861 14 Pages.
Austrian Office Action Application No. A50372/2017 Completed Date: Feb. 28, 2018 2 Pages.
Austrian Office Action Application No. 50622/2017 Completed: Mar. 1, 2018 2 Pages.
International Search Report and Written Opinion of the International Searching Authority Application No. PCT/EP2018/060462 Completed: May 23, 2018; Mailing Date: Jun. 6, 2018 14 Pages.
Bleisch, Günter, Doz. Dr.-Ing., et al.; "Lexikon Verpackungstechnik" ("Lexicon Packaging Technology"; Hiithig Verlag, Heidelberg, Germany; Dec. 2002; 15 Pages.
Indian Office Action; Application No. IN349237; 2 Pages.

* cited by examiner

RECYCLABLE, EASILY TEARABLE PACKAGING LAMINATE HAVING A GOOD BARRIER EFFECT AND METHOD FOR PRODUCTION THEREOF

TECHNICAL FIELD

The present teaching relates to a packaging laminate having a first laminate layer and a second laminate layer, the first laminate layer comprising a barrier layer, and a process for producing such a packaging laminate.

BACKGROUND

In the packaging industry, packaging laminates are used, which should have different proper-ties depending on the application. Such packaging laminates are usually multi-layer plastic films which are produced by extrusion, co-extrusion (in both cases both flat film and blown film) or laminating (joining individual layers with a laminating adhesive), or mixtures thereof. Packaging laminates can also include layers that are not made of plastic, such as a layer of aluminum or paper. The packaging laminate usually also has an outer sealing layer in order to process the packaging laminate into the desired packaging, such as a pouch, sack, bag, etc., by thermo-sealing. In another application, a packaging laminate can also be designed as a shrink film which, depending on the application, can also be manufactured in a sealable, but unprinted version, e.g. for packaging larger portions of meat.

A typical requirement of a packaging laminate is a barrier function against water vapor, oxy-gen and aroma. For this purpose, the packaging laminate usually contains a barrier layer of aluminum or a suitable barrier polymer, such as ethylene vinyl alcohol copolymer (EVOH) or polyamide (PA). Other layers may also be present to give the packaging laminate the desired properties, such as toughness, stiffness, shrinkability, tear strength, etc. A sealing layer is typically made of a polyolefin, usually polypropylene (PP) or polyethylene (PE) in the different densities LLDPE, LDPE, MDPE or HDPE.

In order to be able to process the packaging laminate easily, the packaging laminate must of course not warp or curl, which is why symmetrical layer structures are usually used.

It is also known that the properties of the packaging laminate can be altered by mono- or biaxial orientation. Such orientation can be achieved by the extrusion process, for example in a multiple bubble extrusion process, or only after the extrusion process by stretching the packaging laminate in the machine direction (in the longitudinal direction of the packaging laminate) and/or in the transverse direction (normally in the longitudinal direction). The orientation of the packaging laminate improves in particular stiffness, tensile strength and toughness. Furthermore, the shrinkage property of the packaging laminate can be achieved by orientation, and that even rather turbid materials, such as HDPE, achieve greater transparency after stretching.

WO 2013/032932 A1 describes such a packaging laminate, for example with the structure HDPE/bonding layer/ EVOH/bonding layer/seal layer, as shrink film. The packaging laminate as a whole is biaxially stretched to produce the shrink property. This means that stretching can only be carried out after the individual layers of the packaging laminate have achieved sufficient bond strength. Similar is shown in WO 2009/017588 A1. However, WO 2013/032932 A1 and WO 2009/017588 A1 primarily aim at a suitable material for the bonding layer.

EP 673 759 B1 also describes a packaging laminate for a shrink film, with a barrier layer made of EVOH and at least one further polymer layer that is to be compatible with the barrier layer in terms of stretching properties. An anhydride-modified linear low-density polyethylene (LLDPE) is mentioned as an example for the further polymer layer.

WO 2015/175871 A1 in turn describes a packaging laminate consisting of an HDPE layer bonded to a barrier layer made of, for example, PA, vinyl-containing or acrylate-containing polymers. A sealing layer, e.g. made of LLDPE, may also be arranged at the barrier layer. The aim is to produce a recyclable laminate in which the barrier layer accounts for a maxi-mum of 5% of the total weight of the packaging laminate. The packaging laminate of WO 2015/175871 A1 is not oriented.

In a lot of packaging made of a packaging laminate, it is also desirable to be able to tear the packaging easily by hand, especially for easy opening of the packaging. For example, it is known from WO 2005/113370 A1 that it is easier to tear a unidirectionally stretched film parallel to the stretching direction than across it, and that such a film parallel to the stretching direction can also be torn with reduced tearing force compared to a non-oriented or bidirectionally oriented film. Such a film may also be part of a laminate, which may also include a barrier layer of aluminum or EVOH. The unidirectionally oriented film gives the laminate good tearing properties parallel to the stretching direction and essentially prevents tearing across this direction.

EP 1 769 908 A1 describes that a laminate consisting of a barrier layer (e.g. EVOH) and a plastic layer on both sides can easily be torn in both directions, if the plastic layer consists of a mixture of PE with a density between 0.910 g/cm$^3$ and 0.960 g/cm$^3$ (i.e. LDPE, MDPE or HDPE) and a polycyclic olefin, such as a cycloolefin copolymer (COC), and the laminate is subjected to slight bidirectional stretching. Such low bi-directional stretching occurs, for example, in blown film extrusion, which means that a separate orientation step of the laminate after extrusion can be omitted. Due to its COC content, however, such a laminate is only partially recyclable and more complex to produce than a pure material. With a high COC content, up to 60% COC in the mixture is mentioned, the laminate is no longer recyclable at all, at least if the PE content also contains larger amounts of LDPE.

SUMMARY

It is an object of the present teaching to specify a recyclable packaging laminate, which can be easily produced and which is easily tearable in both directions. It is also a task to specify a manufacturing process for such a packaging laminate.

This object is achieved by co-extrusion of a first laminate layer consisting of a substrate layer with an HDPE content of at least 60% by volume, a bonding layer and a barrier layer of a barrier polymer, preferably of polyamide or ethylene-vinyl alcohol copolymer, with a maxi-mum thickness of 20% of the total thickness of the first laminate layer, wherein the bonding layer being arranged between the substrate layer and the barrier layer, by the subsequent stretching of the co-extruded first laminate layer in the machine direction, and by the subsequent connecting of the thus stretched first laminate layer with a second laminate layer having a polyethylene content of at least 80% by volume, wherein the second laminate layer being bonded with the barrier layer of the first laminate layer. The packaging laminate according to the present teaching comprises a first laminate layer and a second laminate layer, wherein the first laminate layer is a co-extruded, in the machine direction stretched composite consisting of a substrate layer having an HDPE content of at least 60% by volume, a bonding layer and a barrier layer of a barrier polymer, preferably polyamide or ethylene-vinyl alcohol copolymer, having a thickness of at most 20% of the total thickness of the first laminate layer, wherein the bonding layer is arranged between the substrate layer and the barrier layer and the first laminate layer is bonded to the second laminate layer at the barrier layer thereof.

The unidirectional stretching of the first laminate layer before lamination with the second laminate layer significantly increases the barrier effect of the first laminate layer. In addition, it was surprisingly found that by unidirectional stretching, the first laminate layer with the defined structure can be torn equally easily in both directions. These tearing properties are impressed on the packaging laminate, so that the packaging laminate itself can also be torn easily in both directions. In addition, production is considerably simplified by the simple, asymmetrical structure and the merely unidirectional stretching of the first laminate layer compared to conventional symmetrical, bidirectional stretched structures, which also significantly reduces production costs.

A layer stretched in the machine direction (MDO) with a high HDPE content, especially if the HDPE content is greater than 80% and above, tends to splice in the longitudinal direction. Therefore, in PE packaging laminates, such MDO layers with a high HDPE content have al-ways been combined so far with the tougher LLDPE or mLLDPE, e.g. by a further layer of LLDPE, whereby a high LLDPE content in the packaging laminate was aimed for. Surprisingly, it was also found that the first laminate layer with such a high HDPE content (even towards 100% HDPE) is sufficiently tough even without such a tough LLDPE layer and does not tend to splice. The reason for this is the bonding layer, which gives the laminate layer the required toughness. The first laminate layer can therefore also be used advantageously as a barrier film.

Due to the good transparency of the stretched HDPE substrate layer, the optical properties of the packaging laminate can be improved, if the first laminate layer is printed, metallized or coated on the barrier layer prior to bonding with the second laminate layer. The barrier effect can be further increased by metallizing or coating.

It is advantageous for certain applications, if the first laminate layer on the substrate layer is bonded to another single-layer or multi-layer laminate layer. The first laminate layer can be printed, metallized or coated on the barrier layer and/or on the substrate layer. Likewise, at least one layer of the further laminate layer can be printed, metallized or coated.

For certain applications it is advantageous, if the first laminate layer on its substrate layer is bonded to a unidirectionally stretched fourth laminate layer, which has a substrate layer with an HDPE content of at least 60% by volume, a barrier layer made of a barrier polymer and a bonding layer arranged in between. Such a packaging laminate has particularly good barrier properties.

[owls] A further advantageous embodiment is obtained, if the second laminate layer is a co-extruded, in the machine direction stretched laminate consisting of a substrate layer with an HDPE content of at least 60% by volume, preferably at least 70% by volume and particularly preferably at least 80% by volume, a bonding layer, a barrier layer of a barrier polymer, preferably of polyamide or ethylene-vinyl alcohol copolymer, having a thickness of at most 20% of the total thickness of the second laminate layer and a sealing layer, wherein the bonding layer of the second laminate layer is arranged between the substrate layer and the barrier layer of the second laminate layer and the sealing layer is arranged on the substrate layer and wherein the barrier layer of the second laminate layer is bonded to the barrier layer of the first laminate layer. Such a packaging laminate also has particularly good barrier properties. In addition, the sealing layer is advantageously integrated into the co-extruded second laminate layer, so that no further manufacturing steps are required for the packaging laminate.

BRIEF DESCRIPTION OF THE DRAWINGS

The present teaching is explained in more detail below with reference to FIGS. 1 to 5, which show exemplary, schematic and non-restrictive advantageous embodiments of the present teaching.

DETAILED DESCRIPTION

Figure 1:
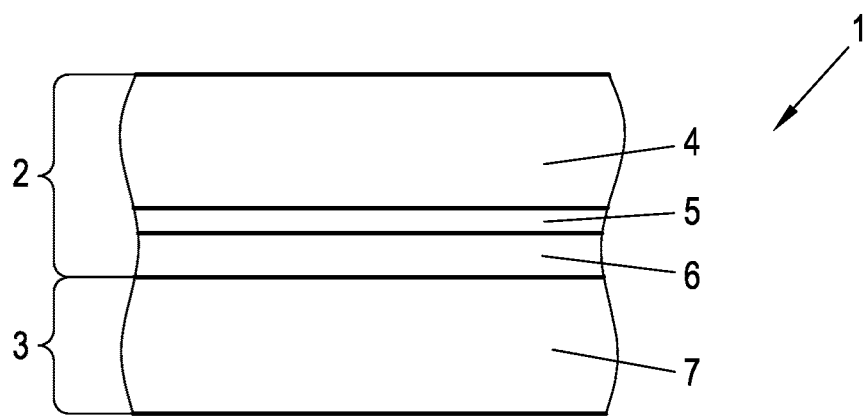
FIG. 1 shows a first embodiment of a packaging laminate according to the present teaching.

FIG. 1 shows a packaging laminate 1 according to the present teaching with a first laminate layer 2 and a second laminate layer 3 connected thereto.

The first laminate layer 2 in the packaging laminate 1 is stretched in the machine direction (MDO) and has an asymmetrical layer structure with a substrate layer 4 and a barrier layer 6, which are interconnected by a connecting layer 5. The thickness of the first laminate layer 2 is preferably 10 to 40 μm.

Substrate layer 4 has a content of high-density polyethylene (HDPE) of at least 60% by volume, preferably at least 70% by volume and particularly preferably at least 80% by volume. The HDPE content can reach up to 100% by volume, but due to common additives (such as slip additives, anti-block additives, fillers, etc.) 100% by volume is usually never reached. An HDPE is a PE with a density between 0.94-0.97 $g/cm^3$. The remainder is a compatible polyolefin material, preferably a low-density linear polyethylene (LLDPE) (with a density between 0.87-0.94 $g/cm^3$), a low-density polyethylene (LDPE) (with a density between 0.915-0.935 $g/cm^3$) or also a linear low-density metallocene polyethylene (mLLDPE), in particular to increase toughness. Any type of polyethylene can be considered as a compatible polyolefin material, especially also ethylene copolymers such as ethylene-vinyl acetate copolymer (EVA), methacrylic acid ethyl ester (EMA), ethylene/acrylic acid copolymer (EAA) or ethylene/butyl acrylate copolymer (EBA). Similarly, polypropylene (PP) or a cycloolefin copolymer (COC) of up to 20% by volume can also be used as a compatible polyolefin material. In the case of PP, a polypropylene random copolymer with ethylene as comonomer (usually 5 to 15%), a polypropylene copolymer with ethylene or a polypropylene homopolymer sufficiently compatible with linear PE types such as mLLDPE, LLDPE or HDPE is preferably used to achieve at least limited recyclability.

The HDPE and the compatible polyolefin material can be present as a mixture in substrate layer 4. Substrate layer 4 can also be multilayer (extruded or co-extruded) with one (or more) HDPE layer and one (or more) layer of the polyolefin material. The thickness of the substrate layer 4 is preferably 5 to 35 μm.

Barrier layer 6 consists of a barrier polymer, i.e. a polymer with sufficient barrier properties, especially against oxygen, hydrogen and/or aroma. The barrier polymer is preferably a polyamide (PA) or an ethylene-vinyl alcohol copolymer (EVOH). EVOH is preferred as a barrier polymer. The barrier layer 6 has a thickness of no more than 20%, preferably 5 to 10%, of the total thickness of the first laminate layer 2, i.e. a maximum of 2 to 8 μm. Because of the low thickness of barrier layer 6 recyclability is not impaired.

The bonding layer 5 serves to connect the barrier layer 6 and the substrate layer 4. A sufficient bond adhesion is to be achieved, in particular to reliably prevent undesired delamination of the first laminate layer 2. Suitable bonding layers 5 preferably consist of polymers with increased polarity, for example on the basis of polyolefins modified with maleic anhydride (such as PE or PP), ethylene-vinyl acetate copolymer (EVA), ethylene/acrylic acid copolymer (EAA), ethylene-butyl acrylate copolymer (EBA) or similar polyolefin copolymers. The thickness of a bonding layer 5 is a maximum of 10% of the total thickness of the first laminate layer 2, typically 1 to 5 μm.

The second laminate layer 3 consists mainly of a PE, whereby the PE content of the total polymer quantity of the second laminate layer 3 without any added mineral substances or other fillers should be at least 80% by volume. Various PE types can be used, i.e. LDPE, LLDPE, MDPE, HDPE in pure form or also as a mixture or in the form of co-polymers or multilayer. The thickness of the second laminate layer 3 is typically between 20 and 200 μm, depending on the application of the packaging laminate 1.

In the second laminate layer 3, too, the remainder will naturally consist of a compatible polyolefin material, as described above, in order to achieve the desired recyclability.

By using predominantly PE and compatible materials in packaging laminate 1, a particularly recycling-friendly laminate can be produced that can be easily and cost-effectively recycled using conventional methods in mechanical recycling.

The first laminate layer 2 is produced by co-extrusion, because this allows for particularly simple, cost-effective production. Preferably, the well-known blown film or flat film extrusion process is used.

After co-extrusion, the first laminate layer 2 is stretched exclusively in the machine direction (usually the longitudinal or extrusion direction). The degree of orientation is preferably at least 4:1 in the machine direction. Stretching can take place in-line (i.e. immediately after co-extrusion) or off-line (i.e. at a later point in time after co-extrusion). Unidirectional stretching can be carried out much more easily and cost-effectively than bidirectional stretching, which reduces production costs.

It should be noted here that in blown film extrusion and flat film extrusion, the extrusion gap (1.5 to 2.5 mm for blown film) or the gap of the extrusion nozzle is significantly larger than the final thickness of the extruded film (typically between 10 and 200 μm). To achieve this, the extruded melt is stretched at temperatures well above the melting point of the extruded polymer, giving it its final thickness. In blown film extrusion, for example, the melt is typically stretched in the transverse direction by about factor of 2 to 3 (the so-called blow-up ratio) and in the longitudinal direction by a factor of 1:10 to 1:100 (the so-called draw-off ratio). However, this stretching during extrusion cannot be compared to orientating a plastic film, since orientating is usually carried out at temperatures just below the melting point of the polymer in order to permanently align the disordered polymers and the partially crystalline areas by stretching in the stretching direction.

An asymmetrical structure of the first laminate layer 2 with an orientation in the machine direction is untypical and has so far been avoided in practice, especially with blown film, since it was assumed that such a structure would curl, in particular by absorbing water with the polar barrier layer 6, which would make further processing more difficult or impossible. It has been shown, however, that curling in the concrete design of the structure takes place to an acceptable degree that does not hinder further processing. It is advantageous to this end when the first laminate layer 2 is bonded to the second laminate layer 3 very soon after production in order to reduce in particular the water absorption of the barrier layer 6. Under certain circumstances it may also be necessary or useful to protect the co-extruded film roll with the first laminate layer 2 from water absorption by means of suitable packaging until lamination.

The main advantage of the untypical asymmetrical structure of the first laminate layer 2, however, is that only a single expensive and less rigid bonding layer 5 is required. This allows the costs for the first laminate layer 2 to be reduced and a stiffer first laminate layer 2 to be achieved. The higher stiffness is particularly advantageous when packaging laminate 1 is used to produce a bag.

Further advantages of the inventive first laminate layer 2 result from the stretching. This results in high transparency, especially of the substrate layer 4. By stretching the barrier layer, about three to four times higher barrier values are achieved compared to the non-oriented barrier polymer of the same type, so that less expensive barrier polymer can be used with the same barrier effect. This can significantly reduce the cost of the first laminate layer 2.

It has also come as a surprise that, despite its orientation only in the machine direction, such a first laminate layer 2 can easily be torn by hand in both directions (i.e. in the machine direction and transverse to it), without the film being elongated excessively when torn in the transverse direction.

The first laminate layer 2 is preferably produced using the blown film extrusion process, because this results in fewer trim edge waste due to production, which leads to lower costs for packaging laminate 1, especially with the more expensive barrier polymers. In blown film extrusion, more viscous HDPE materials with an MFI (Mass Flow Index) of less than 3 can also be used. Such HDPE materials have a higher molecular weight and better mechanical properties, which is favorable for use in a packaging laminate 1. However, such a material would tear particularly easily in the longitudinal direction and even lead to undesired splicing in the longitudinal direction. This undesirable property can be eliminated by incorporating the HDPE material with an MFI of less than 3 in a first laminate layer 2, as described, and even uniform tearing in both directions can be achieved.

A first laminate layer 2 oriented in the machine direction, with a substrate layer 4, a barrier layer 6 and a bonding layer 5, as described above, does not tend to splice in the longitudinal direction, even despite the high HDPE content of 60 vol %, and especially also not at very high HDPE contents of more than 80% by volume to 100% by volume, as was surprisingly determined. This effect occurs both with an asymmetrical structure of the first laminate layer 2 and with a symmetrical structure of the first laminate layer 2. This observed effect is proven for a first laminate layer 2 as barrier film by means of the following examples in Table 1.

TABLE 1

|  |  | Film A | Film B | Barrier film C | Barrier film D |
|---|---|---|---|---|---|
| Film thickness |  | 20 | 20.8 | 20.6 | 20.8 |
| Tensile strength | MD | 66 | 59 | 51.7 | 46.9 |
|  | TD | 3 | 11 | 10 | 9 |
| Elongation at break | MD | 52 | 23 | 67 | 30 |
|  | TD | 4 | 12 | 125 | 215 |
| Tear strength | MD | 2.4 | 6.5 | 5.4 | 5.6 |
|  | TD | 4.1 | 4.3 | 6.1 | 5.4 |

Table 1 shows the tensile strength in longitudinal direction (MD) and transverse direction (TD) in N/15 mm and measured according to ASTM D882, the elongation at break in longitudinal direction (MD) and transverse direction (TD) in % and measured according to ASTM D882 and the tear strength in longitudinal direction (MD) and transverse direction (TD) in N and measured according to DIN EN ISO 6383-1. The thickness is the total thickness of the respective film and is given in μm.

Film A in Table 1 is an MDO HDPE mono-film with 10% by volume mLLDPE. Film A is constructed as a five-layer coextrusion film with 10% by volume mLLDPE in all five, equally thick layers (structure 1/1/1/1/1). The orientation ratio in the machine direction is 6:1. Such a film 1 tends to splice in the longitudinal direction, which is particularly evident from the very low tensile strength and elongation at break in the transverse direction. The tear strength in the longitudinal direction is also significantly lower than with the other comparative films in Table 1, which is also an indication of the splicing tendency in the longitudinal direction.

Film B is also a five-layer co-extrudate with a film structure of 95% HDPE+5% LLDPE/100% HDPE/60% HDPE+40% LLDPE/100% HDPE/100% HDPE. The orientation ratio in the machine direction is 6:1. Thus, in film B, a tough component (LLDPE) in higher proportions (40%) was added in at least one layer to reduce the tendency to splice, as was usual up to now. This can be seen from the higher values of tensile strength in transverse direction, elongation at break in transverse direction (TD) and tear strength in longitudinal direction compared to film A.

However, the better effect is achieved with a barrier film C. The barrier film C is a five-layer co-extrudate with the film structure 95% HDPE+5% LLDPE/100% HDPE/60% HDPE+40% LLDPE/bonding layer 5/EVOH barrier layer 6. The orientation ratio of the co-extruded barrier film 3 in the machine direction is 5:1. The substrate layer 4 in this film has three layers (layer thickness 4 μm/4 μm/8 μm) with a HDPE content of ~78% by volume in the substrate layer 4. The bonding layer 5 is 2 μm in the barrier film C, i.e. 10% of the total thickness, and the barrier layer 5 is also 2 μm, i.e. 10% of the total thickness. This results in a 2/2/4/1/1 structure of the barrier film C. The bonding layer 5 gives the barrier film C sufficient toughness to significantly reduce the splicing tendency in the longitudinal direction. This can be seen from the significantly higher values of elongation at break in the transverse direction (TD) and tear strength in the longitudinal direction. The tensile strength in the transverse direction is comparable to film B.

It was particularly surprising that for this effect it makes almost no difference, if the HDPE content in the substrate layer 4 is further increased, as shown by the barrier film D. The HDPE content in the substrate layer 4 is also increased. Barrier film D is a five-layer co-extrudate with the film structure of 95% HDPE+5% LLDPE/100% HDPE/100% HDPE/bonding layer 5/EVOH Barrier layer 6. The low LLDPE content in the outermost layer is primarily used to modify the surface properties of barrier film D to improve processing properties. The orientation ratio in the machine direction is again 5:1. The substrate layer 4 in it has three layers (layer thicknesses 4 μm/4 μm/8 μm) with an HDPE content of ~97% by volume in the substrate layer 4. The bonding layer 5 in the barrier film D is 2 μm, i.e. 10% of the total thickness, and the barrier layer 6 is also 2 μm, i.e. 10% of the total thickness. This results in a 2/2/4/1/1 structure of barrier film D. In barrier film D, the tear strength behavior in the longitudinal and transverse directions is even particularly uniform.

Figure 5:
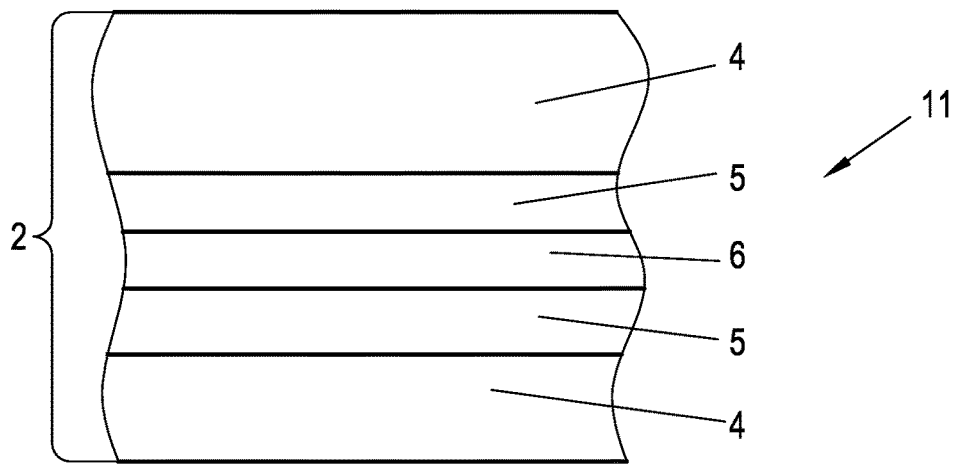
FIG. 5 shows an embodiment of a first laminate layer as a symmetric barrier film.

In Table 1 only asymmetrical film structures of MDO barrier film 11 are described. For the first laminate layer 2 used as an inventive barrier film 11, however, symmetrical structures are also possible (as shown in FIG. 5), for example in the form substrate layer 4 of 100% by volume HDPE/bonding layer 5/EVOH barrier layer 6/bonding layer 5/substrate layer 4 of 100% by volume HDPE. In one (or both) of the substrate layers 4 a low mLLDPE or LLDPE content (e.g. 5 to 10% by volume) could also be added, preferably in one of the outermost layers to modify the processing properties. In such a symmetrical structure, the two outer substrate layers 4 can also be thicker than the inner layers, e.g. in the form of an x/1/1/1/x, structure with x>1, in particular x=1.5, 2, 3 or 4.

Such a first laminate layer 2 alone as barrier film 11 is also regarded as inventive and is characterized in particular by at least one substrate layer 4, which has an HDPE content of at least 60% by volume, preferably at least 80% by volume, and which is bonded via a bonding layer 5, as described above, to a barrier layer 6, as described above. The substrate layer 4 can also have a multi-layer structure. In addition, the barrier layer 6 can be bonded to another substrate layer 4, as described above, for a symmetrical structure by means of a further bonding layer 5, as described above. Such a barrier film 11 is produced by co-extrusion and subsequent stretching in the machine direction. The degree of orientation is preferably at least 4:1 in the machine direction. Stretching can take place in-line (i.e. immediately after co-extrusion) or off-line (i.e. at a later point in time after co-extrusion).

For the production of packaging laminate 1, the stretched first laminate layer 2 and the second laminate layer 3 are joined together, preferably by extrusion lamination, extrusion coating or adhesive lamination, wherein the second laminate layer 3 being joined to the barrier layer 6 of the first laminate layer 2. In extrusion coating, the second laminate layer 3 is extruded onto the barrier layer 6 of the first laminate layer 2, preferably with an adhesion agent in between. When laminating, the second laminate layer 3 is bonded to the barrier layer 6 using a suitable laminating adhesive, for example based on a polyurethane adhesives or polyolefin copolymers for extrusion lamination. The thickness of the laminating adhesive is preferably 2 to 5 g/m² for conventional adhesives based on polyurethane or 5 to 20 g/m² for extrusion lamination.

In the case of suitable second laminate layers 3, it has turned out that the entire packaging laminate 1 also adopts the tearing properties of the first laminate layer 2, i.e. packaging laminate 1 can be torn equally easily by hand in both directions. The first laminate layer 2 thus impresses the tearing properties on the packaging laminate 1.

The second laminate layer 3 preferably forms a sealing layer 7, which in a package made of packaging laminate 1 usually faces the packaged product. The packaging is produced by cutting, folding and thermo-sealing the packaging laminate 1. Possible packaging products include bags, pouches, sacks, etc.

Figure 2:
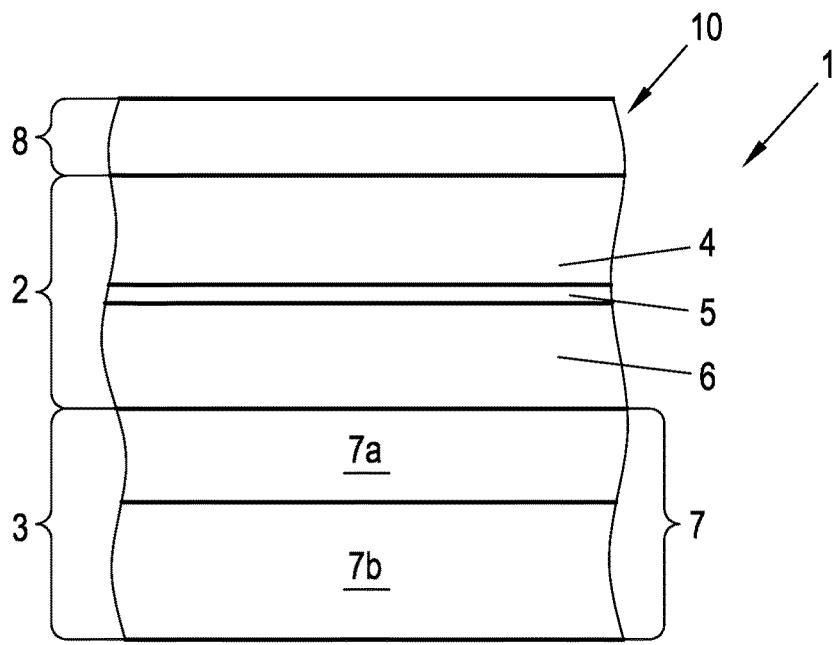
FIG. 2 shows a second advantageous embodiment of a packaging laminate according to the present teaching.
Figure 4:
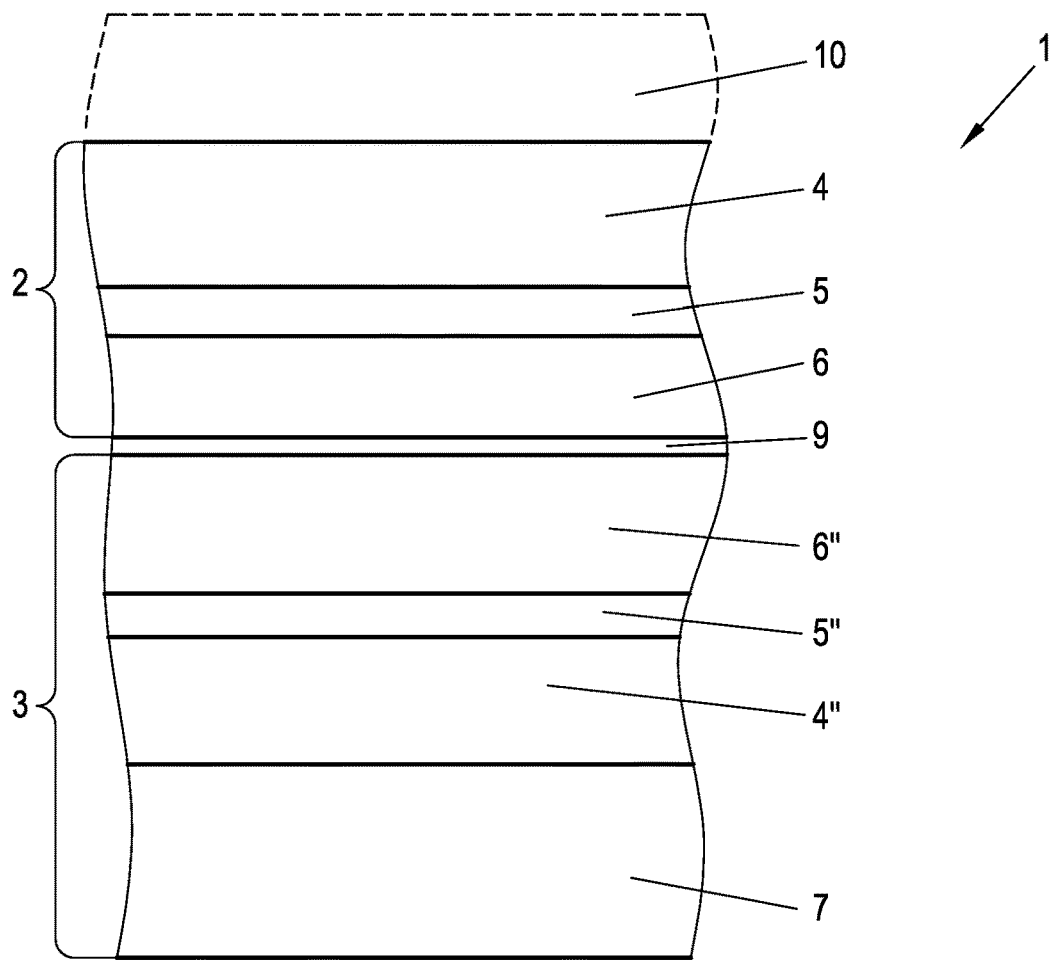
FIG. 4 shows a fourth advantageous embodiment of a packaging laminate according to the present teaching.

The second laminate layer 3 can also be multi-layer, for example extruded or co-extruded, as indicated in FIG. 2 and described in detail below. However, the second laminate layer 3 can also be equipped with a barrier function and can also be stretched, as indicated in FIG. 4 and described in detail below.

In a further embodiment of the packaging laminate 1, as shown in FIG. 2, the first laminate layer 2 is connected on the side of the barrier layer 6 to the second laminate layer 3 and on the side of the substrate layer 4 to a further laminate layer 10, here a third laminate layer 8. The third laminate layer 8 is preferably a single-layer or multi-layer polymer film, for example a film of predominantly PE (at least 80% by volume PE), as described with respect to the second laminate layer 3. The third laminate layer 8 can be either extrusion-coated or adhesive-laminated onto the first laminate layer 2, as explained with reference to the sealing layer 7 in FIG. 1. Such a packaging laminate 1 according to FIG. 2 can, for example, be used for the production of tubes. In this case, the thickness of the second laminate layer 3 and the third laminate layer 8 is typically in the range of 150 μm.

It is further indicated in FIG. 2 that the second laminate layer 3 can also have a multilayer structure, here for example with two layers 7a, 7b, which form the sealing layer 7. The same applies to the third laminate layer 8. Such a structure of the second laminate layer 3 can, of course, also be provided in an embodiment according to FIG. 1.

It is also possible to metallize and/or print and/or coat (e.g. with alumina or silica) the stretched first laminate layer 2 after stretching at barrier layer 6 before joining the first laminate layer 2 to the second laminate layer 3. Metallization with aluminum is preferred. The HDPE substrate layer 4 is sufficiently transparent, especially after stretching, so that the printed image, the metallization or the coating is visible through the substrate layer 4. Barrier layer 6 can also be pre-treated for printing purposes on the surface to be printed, for example by corona or flame treatment, to improve the adhesion of the printing layer to barrier layer 6. Alternatively or additionally, the substrate layer 4 can also be printed, metallized or printed, both on the side facing the barrier layer 6 and on the other side, if necessary again after a surface treatment. Common printing processes can be used, such as gravure printing or flexographic printing.

The third laminate layer 8 could also be printed, metallized or coated on one or both sides, in addition to or as an alternative to the first laminate layer 2.

In an advantageous arrangement of the exemplary embodiment of FIG. 2, the barrier layer 6 of the first laminate layer 2 is metallized, preferably with aluminum, in order to increase the barrier effect. In addition, the third laminate layer 8 could be printed on the outside.

Figure 3:
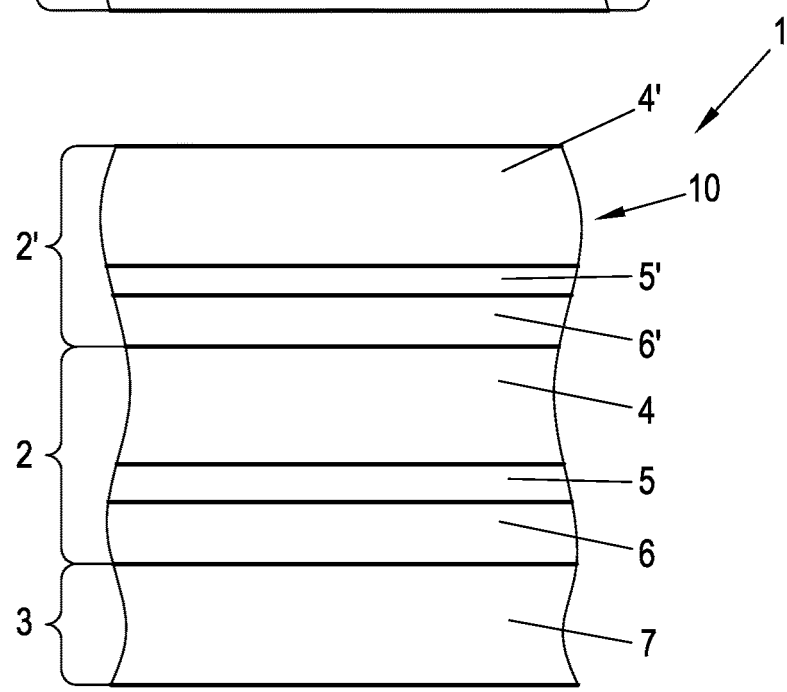
FIG. 3 shows a third advantageous embodiment of a packaging laminate according to the present teaching.

FIG. 3 describes another exemplary embodiment of an inventive packaging laminate 1, which can preferably be used for the production of tubes. In this embodiment, the first laminate layer 2 is joined to the second laminate layer 3 on the barrier layer 6, as in the example in FIG. 1. The first laminate layer 2 is bonded at its substrate layer 4 with another laminate layer 10, here a fourth laminate layer 2', which has the same structure as the first laminate layer 2 and which is also unidirectionally stretched. The fourth laminate layer 2' thus again comprises a substrate layer 4', which is bonded to a barrier layer 6' with a bonding layer 5'. The barrier layer 6' of the fourth laminate layer 2' is bonded to the substrate layer 4 of the first laminate layer 2, preferably with a suitable laminating adhesive, as described above. These layers of the fourth laminate layer 2' are constructed and assembled as described above. The fourth laminate layer 2' consists primarily of PE materials with at least 80% PE by volume. However, the thicknesses and the exact compositions or materials of the individual layers of the first laminate layer 2 and the fourth laminate layer 2' do not have to match.

Also in this embodiment, the fourth laminate layer 2' on the substrate layer 4' and/or on the barrier layer 6', can be printed, metallized or coated, additionally or alternatively to the first laminate layer 2. In a particularly advantageous embodiment, the fourth laminate layer 2' is printed, preferably on its barrier layer 6', and the first laminate layer 2 is metallized, preferably on its barrier layer 6 or substrate layer 4. This increases the barrier effect of the packaging laminate 1. However, a coating of aluminum oxide or silicon oxide can also be provided on barrier layer 6 or substrate layer 4 of the first laminate layer 2 to further increase the barrier effect.

FIG. 4 describes another advantageous embodiment of the present teaching. In this embodiment the second laminate layer 3 is again multilayered and comprises a substrate layer 4", a barrier layer 6" and a bonding layer 5", similar to the first laminate layer 2. For these layers and also for the production of the second laminate layer 3 in this embodiment, the same applies analogously as above for FIGS. 1 to 3 for the first laminate layer 2 or fourth laminate layer 2'. In addition, the second laminate layer 3 in this embodiment comprises a sealing layer 7. The sealing layer 7 preferably consists of a PE material, such as mLLDPE, LLDPE, or another suitable thermoplastic, such as polypropylene (PP). However, this second laminate layer 3 with sealing layer 7 still consists of at least 80% PE by volume. The sealing layer 7 of the second laminate layer 3 is co-extruded with the other layers of the second laminate layer 3. The second laminate layer 3 of FIG. 4 is stretched like the first laminate layer 2 and as described above. The sealing layer 7 in this embodiment is thus integrated in a multi-layer, stretched barrier film, which is constructed similarly to the first laminate layer 2. This second laminate layer 3 thus has essentially the same tearing properties as the first laminate layer 2.

In this embodiment, the unidirectionally stretched first laminate layer 2 and the unidirectionally stretched second laminate layer 3 are joined together at the abutting barrier layers 6, 6", preferably by adhesive lamination by means of an adhesive layer 9. A suitable laminating adhesive is, for example, an adhesive based on polyurethane or a polyolefin copolymer. The thickness of the laminating layer 9 is preferably 2 to 5 g/m².

Also in this embodiment, one (or more) of the layers of the packaging laminate 1 can be printed, metallized or coated.

Of course, in the embodiment the first laminate layer 2 could also have an additional laminate layer 10 (e.g. a third laminate layer 8 or fourth laminate layer 2' as described above), as indicated in FIG. 4.

The packaging laminate 1 in accordance with the present teaching thus has at least one asymmetrical, unidirectionally stretched, first laminate layer 2 of at least 60% HDPE by volume with a substrate layer 4, a barrier layer 6 and a bonding layer 5 and a second laminate layer 3 bonded thereto, which forms a sealing layer 7, with a PE content of at least 80% by volume. As described above, a further single-layer or multi-layer laminate layer 10 (e.g. a third laminate layer 8 or fourth laminate layer 2') with a PE content of at least 80% by volume can be arranged on this packaging laminate 1, on the side of the first laminate layer 2 facing away from the second laminate layer 3. This further single-layer or multi-layer laminate layer 10 is thus bonded to the substrate layer 4 of the first laminate layer 2.

In packaging made of a packaging laminate 1 in accordance with the present teaching, the sealing layer 7 of the packaging laminate 1 advantageously faces the inside of the packaging.

By printing on at least one layer of the first laminate layer 2, the second laminate layer 3 or the further laminate layer 10 of a packaging laminate 1 according to the present teaching with a barrier lacquer, for example polyvinyl alcohol (PVOH), the barrier effect of the packaging laminate 1 can be further increased also in this way. Such lacquer layers can be applied very thinly, typically in the range of 0.5 to 2.0 $g/m^2$, and thus do not impair the recyclability of packaging laminate 1.

Finally, it should be noted that each of the individual layers described above can also have a multi-layer structure in the first laminate layer 2, the second laminate layer 3 or the further laminate layer 10 itself.

The invention claimed is:

1. A packaging laminate comprising
a first laminate and a second laminate,
the second laminate having a thickness between 20 µm and 200 µm and having a polyethylene content of at least 80% by volume,
the first laminate having been formed by coextruding a substrate layer with a HDPE content of at least 60% by volume, a bonding layer, and a barrier layer,
the thickness of the first laminate being between 10 µm and 40 µm,
the thickness of the substrate layer being between 5 µm and 35 µm,
the thickness of the bonding layer being between 1 µm and 5 µm,
the barrier layer having polyamide and/or ethylene-vinyl alcohol copolymer and having a thickness of at most 20% of the total thickness of the first laminate,
the bonding layer being arranged between the substrate layer and the barrier layer,
the first laminate being stretched in machine direction only,
the first laminate is bonded to the second laminate via its barrier layer after the first laminate is stretched, and
wherein said packaging laminate is tearable in both the machine direction and a transverse direction perpendicular to the machine direction.

2. The packaging laminate according to claim 1, wherein the barrier layer of the first laminate is printed and/or metallized and/or coated.

3. The packaging laminate according to claim 1, wherein the first laminate is bonded on its substrate layer to a further single-layer or multi-layer laminate layer having a polyethylene content of at least 80% by volume.

4. The packaging laminate according to claim 3, wherein at least one layer of the further laminate layer is printed and/or metallized and/or coated.

5. The packaging laminate according to claim 3, wherein the further laminate layer is stretched in machine direction and formed by co-extruding a substrate layer with a HDPE content of at least 60% by volume, a barrier layer having a barrier polymer, and a bonding layer arranged in between, wherein the substrate layer of the first laminate is bonded to the barrier layer of the further laminate layer.

6. The packaging laminate according to claim 1, wherein the second laminate is stretched in machine direction and is co-extruded with a substrate layer having a HDPE content of at least 60% by volume, a bonding layer, a barrier layer having a barrier polymer and having a maximum thickness of 20% of the total thickness of the second laminate, and a sealing layer, wherein the bonding layer of the second laminate is between the substrate layer and the barrier layer of the second laminate, and the sealing layer is arranged on the substrate layer, wherein the barrier layer of the second laminate is bonded to the barrier layer of the first laminate.

7. The packaging laminate according to claim 1, wherein the substrate layer of the first laminate has a HDPE content of at least 70% by volume.

8. The packaging laminate according to claim 6, wherein the substrate layer of the second laminate has a HDPE content of at least 70% by volume.

9. The packaging laminate according to claim 5, wherein the barrier polymer of the further laminate layer comprises a polyamide and/or an ethylene-vinyl alcohol copolymer.

10. The packaging laminate according to claim 6, wherein the barrier polymer of the second laminate comprises a polyamide and/or an ethylene-vinyl alcohol copolymer.

11. A packaging laminate, comprising:
a composite comprising the packaging laminate of claim 1; and
a laminate layer bonded to the barrier layer or the substrate layer of the composite.

12. The packaging laminate according to claim 11, wherein the laminate layer comprises a multi-layer laminate.

13. The packaging laminate according to claim 11, wherein the laminate layer is a single-layer.

14. The packaging laminate according to claim 1, wherein the second laminate comprises a multi-layer laminate.

15. The packaging laminate according to claim 1, wherein the second laminate is a single-layer.

16. The packaging laminate according to claim 1, wherein:
the first laminate is coextruded with only the substrate layer, bonding layer, and barrier layer, and with no other layer.

* * * * *